(12) United States Patent
Stenger

(10) Patent No.: US 6,370,790 B1
(45) Date of Patent: Apr. 16, 2002

(54) SELF HOLDING TAPE MEASURE

(76) Inventor: Brian Stenger, 224 N. Piney Rd., P.O. Box 486, Story, WY (US) 82842

( * ) Notice: Subject to any disclaimer, the term of this patent is extended or adjusted under 35 U.S.C. 154(b) by 0 days.

(21) Appl. No.: 09/546,784

(22) Filed: Apr. 11, 2000

(51) Int. Cl.[7] .................................................. G01B 3/10
(52) U.S. Cl. ........................................... 33/758; 33/770
(58) Field of Search ........................... 33/755, 668, 760, 33/768, 758, 770

(56) References Cited

U.S. PATENT DOCUMENTS

| | | | |
|---|---|---|---|
| 1,100,325 A | * 6/1914 | Pronovost | 33/758 |
| 4,649,649 A | 3/1987 | Fain | 33/138 |
| 4,930,227 A | * 6/1990 | Ketchpel | 33/755 |
| 5,175,940 A | * 1/1993 | Naill et al. | 33/666 |
| 5,379,524 A | * 1/1995 | Dawson | 33/768 |
| 5,402,583 A | 4/1995 | Komura | 33/758 |
| 5,659,970 A | 8/1997 | Reedy | 33/758 |
| 6,070,338 A | * 6/2000 | Garity | 33/760 |

* cited by examiner

*Primary Examiner*—David J. Colilla
(74) *Attorney, Agent, or Firm*—Santangelo Law Offices, P.C.

(57) ABSTRACT

A tape measure having an end hook and housing capable of attaching itself "in whole" both the end hook and housing to steel surfaces and with the end hook being able to attach to wood and such materials. The end hook has a magnet riveted firmly to the underneath side of the measuring tape for holding itself to the steel subject to be measured without falling off. A housing with a magnet recessed into the bottom wall of the housing to be attached to steel subjects. The end hook has a push pin in the shape of a T integrated into the hook leg to be pushed into the work piece and remain intact for the measurement.

5 Claims, 4 Drawing Sheets

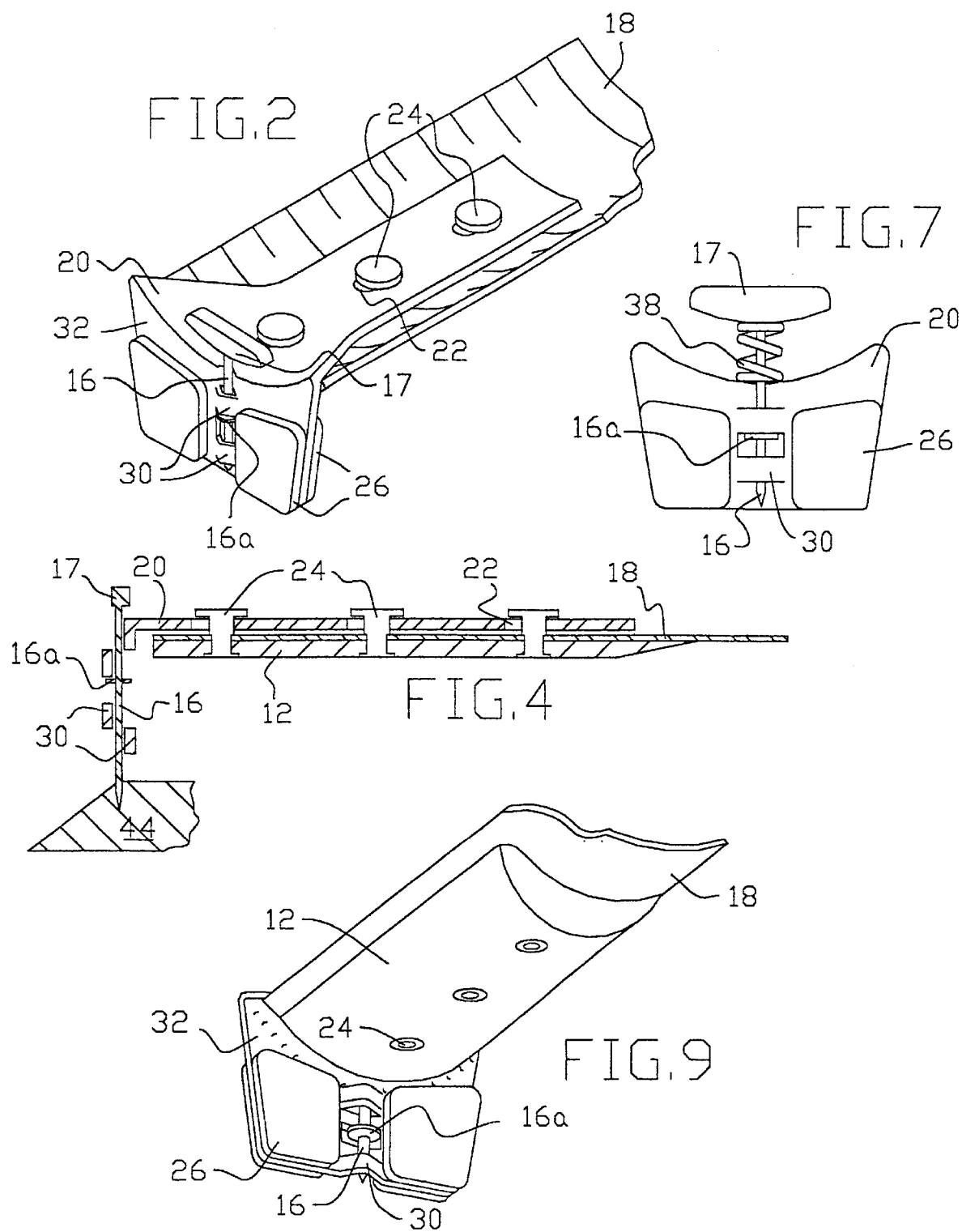

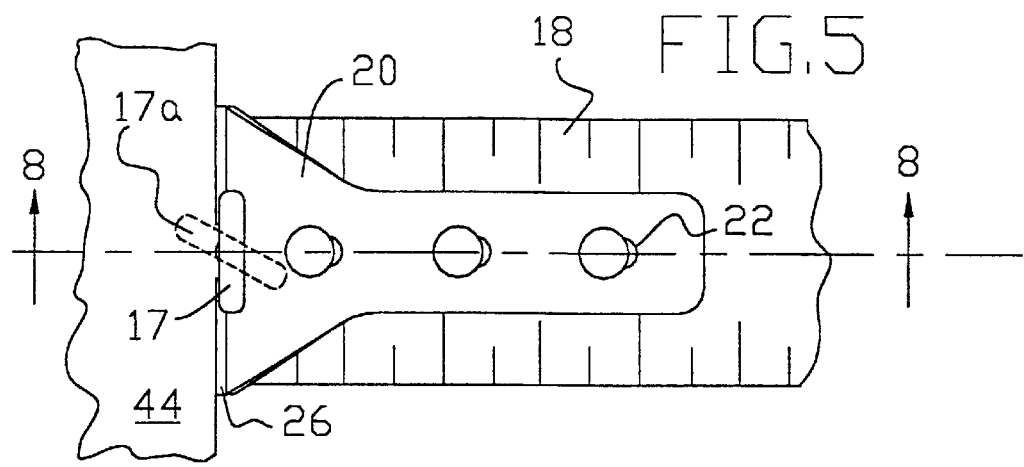
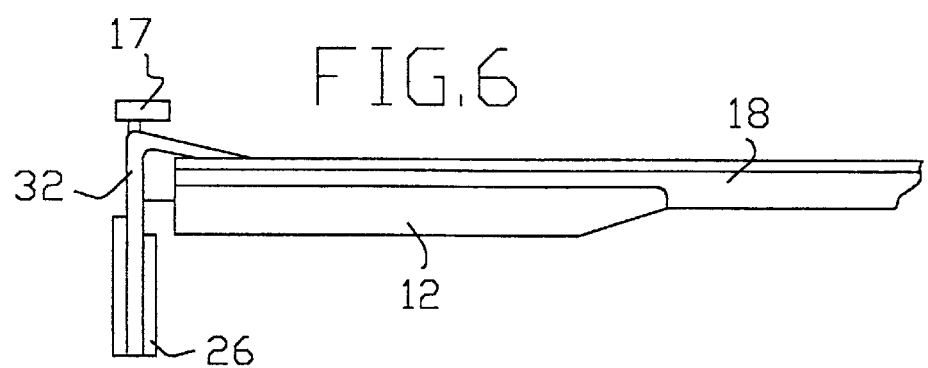
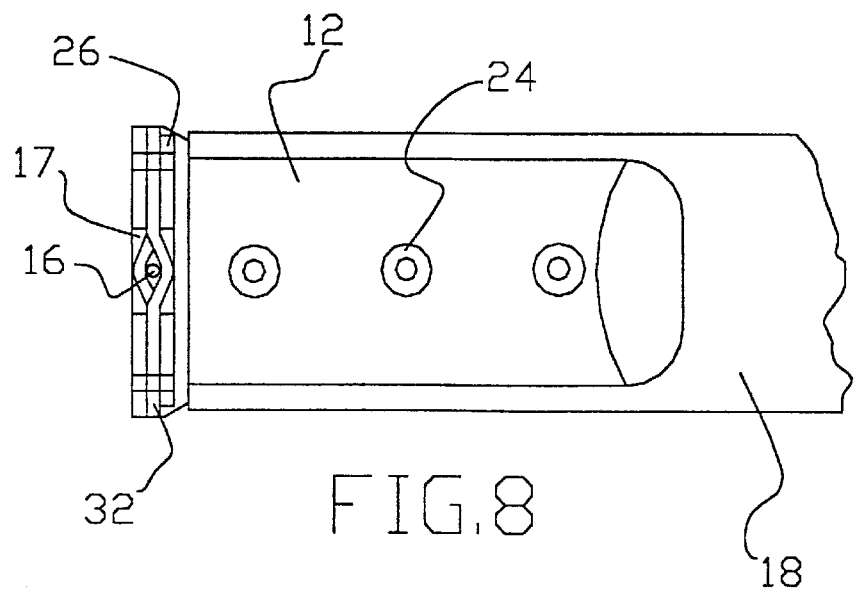

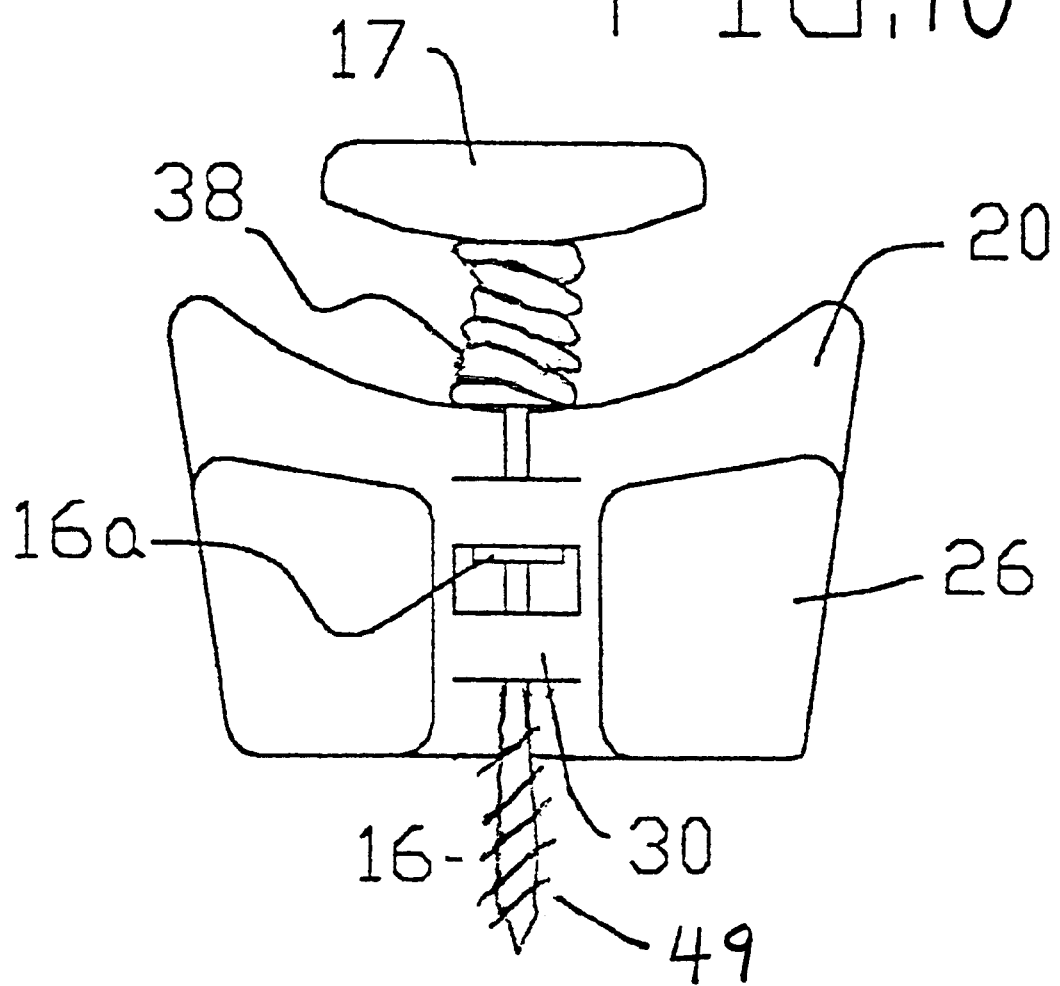

SELF HOLDING TAPE MEASURE

BACKGROUND OF THE INVENTION

Power return tape measures commonly experience the end hook falling off of the surface to be measured. Often the end of the tape measure will not hook securely onto the end of the subject surface because of the shape, angle, or rounded edges where the measurement starts from. Also, when measuring horizontally, if any slack is applied to the tape strip, the end hook will fall off. This has been a common occurrence and burden for the user since the tape measure was first invented.

U.S. Pat. No. 5,402,583 Komura (1995) discloses an end hook having an unevenly etched surface on its front (outside) and rear (inside) surfaces for abutting onto the object to be measured. This invention may solve the problem that Komura intended but it is limited in that it does not address the disadvantages listed above. Many conventional tape measuring systems suffer from a number of disadvantages:

When measuring wood or other material, if the surface or material to be measured does not have a right angle for the end hook to securely attach to, it is difficult to achieve an accurate measurement. This is a common problem which can arise in building structures that have compound angles, such as cutting studs for a wall to support a vaulted ceiling, rafters etc. In such circumstances, it sometimes is easier to measure from the "short point" as it is referred to in "laymen terms". This can only be achieved by either trying to hold the end hook in a manner that is clumsy or inaccurate, by nailing it in place or by someone else holding it.

In windy conditions iron workers, carpenters, welders etc., can find it almost impossible to facilitate an accurate measurement when the measuring strip is extended greater than the reach of the user holding the end hook with one hand and the housing in the other.

When measuring steel stock, wood, or other such material there is a tendency for the material to sag on either side of the work piece creating an uneven support making it difficult to securely attach the end hook and prevent it from slipping off.

SUMMARY OF THE INVENTION

The present invention provides a method for securely attaching a tape measure to a variety of materials by utilizing magnetic properties in both the end hook and the tape strip housing unit which may help to facilitate an accurate measurement of a metal surface or the like in a variety of positions. The magnetic properties in both the end hook and the tape strip housing may facilitate an accurate measurement by attaching the entire tape measurement system securely to a surface whether that surface be flat, vertical, horizontal, or even over the head of the user, giving the user a "hands free" approach and eliminating the need for a second user to assist in holding one end of the tape measure in order to obtain an accurate measurement. This feature may ultimately save time and costs to the user by not having to repeatedly re-attach the tape measure and by not having to utilize another person.

Another object of the present invention may provide a method to obtain an accurate measurement in windy conditions by firmly attaching the end hook, housing or both to prevent the tape strip from blowing off the surface to be measured whether it be wood, steel, or the like, and may be useful in a variety of positions by remaining intact on the object to be measured whether it be vertical, horizontal or upside down, again allowing the user to have both hands free. The tape measure with its magnetic properties may be attached in "whole", both housing and tape end, and may prevent the user to continually having to re-hook the housing or tape end.

Other objects include:

(a) to provide a tape measure that can virtually be attached to steel objects at the housing and tape end or both.

(b) to provide an ability to use such devices upside down, vertical, horizontal or any other position without the aid of another, thus giving the person to have both hands free.

(c) to provide a time saving benefit that it accomplishes by not having to re hook it several times.

(d) to provide a tape measure end that may not blow off the surface to be measured in windy conditions.

(e) to provide a tape measure end that may be attached to wood, steel materials without falling off.

(f) to provide a tape measure housing that may be attached to steel surfaces, and (g) to provide a tape measure that may have greater capabilities than existing ones and still be able to be manufactured at a competitive price.

DESCRIPTION OF THE DRAWINGS

FIG. 2 shows a fragmentary perspective view of the end hook and the present invention.

FIG. 4 is a fragmentary sectional view along 8—8 of FIG. 5 of the tape end and drawn to an enlarged scale with the push in engaged over the fragmentary illustrated work piece.

FIG. 5 is a top plan view of the fragmentary end of the tape embutted into the fragmentary illustrated work piece.

FIG. 6 shows a side view thereof.

FIG. 7 shows a front view of the end hook of FIG. 2 drawn to an enlarged scale, with spring; spring not shown in other figures due to possible crowding.

FIG. 8 is a bottom plan view of the fragmentary end hook.

FIG. 9 is a bottom fragmentary perspective view of the tape end and the present invention.

FIG. 10 is a front view of the push pin including threads to aid in insertion or holding by twisting the pin head.

DESCRIPTION OF THE PREFERRED EMBODIMENTS

Figure 1:
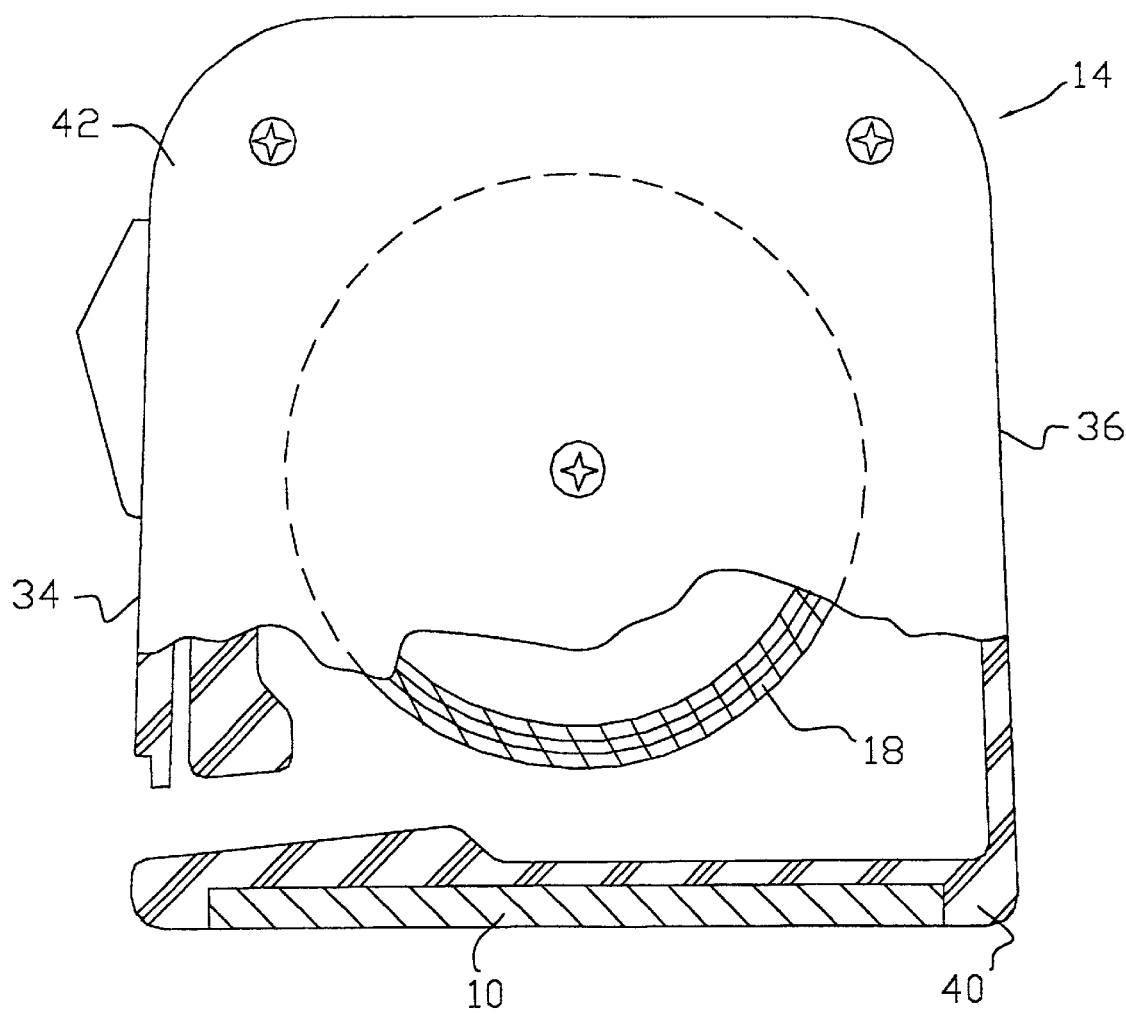
FIG. 1 shows a side plan, partially cut away view of one embodiment of a measuring tape housing according to the present invention.

A typical embodiment of the magnetic housing and end hook in the present invention is illustrated in FIG. 1 (side plan view) and FIG. 2 (perspective view). Referring to the drawing in FIG. 1 is a recoilable tape measure consisting of a front wall (34), rear wall (36), side walls (42) and bottom wall (40). On the bottom wall (40) of the housing (14) is a magnet (10) which may be imbedded into the housing with the use of adhesive to hold it in place. It may be recessed flush with said housing to provide a flat plane which may help to obtain a magnetic bond between the housing and its metal subject.

As seen in FIG. 2, the end hook (20) with its modification of a push in (16) may aid in the holding of the tape end. The holding apparatus (30) may be designed to hold and guide the pin. The pin retainer (19) may be used to keep the pin within its slidable range which is needed to protect the spring from being damaged and may also retain the pin within its expenditures. The pin retainer may consist of a small ledge protruding outward that will encircle the pin 360 degrees and not large enough to affect it mechanically. The pin retainer may be able to spin in any direction. Thickening plates (26) may be used to make up extra thickness needed to match holding apparatus thickness on both sides of leg portion (32). The hook (20) may be secured to the tape by three rivets (24) which extend through axially spaced and axially elongated apertures or slots (22) in the body portion of the hook (20). This may permit sliding of the end hook (20) relative to the end of the measuring tape (18) to account for the thickness of the hook leg (32) for accurate measurements whether the end hook (20) is hooked over an edge of an object being measured or abutted against an object for an inside dimension measurement.

Figure 3:
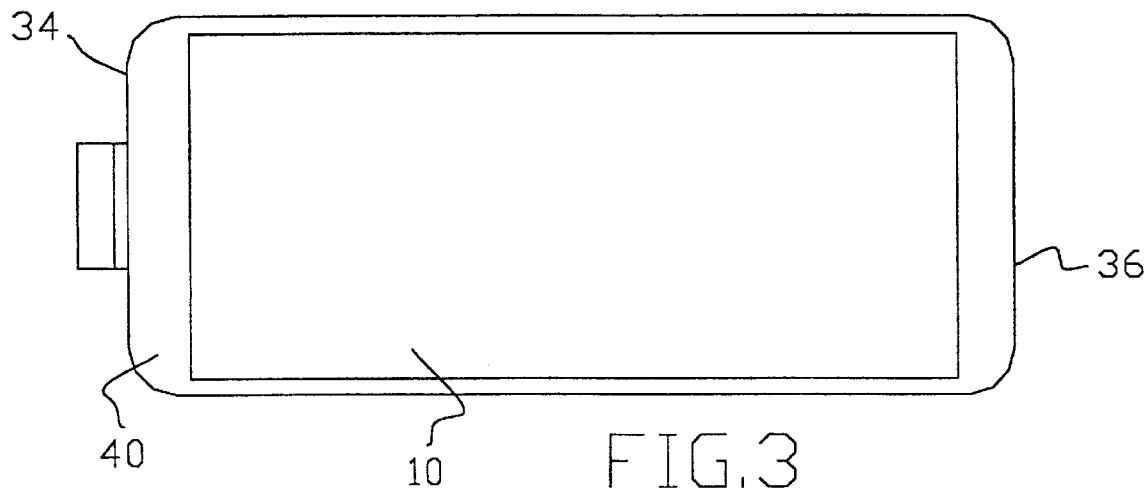
FIG. 3 shows a bottom plan view of the tape housing.

FIG. 3 is a bottom plan view of bottom wall (40) where the housing magnet (10) may be imbedded into the housing.

In FIG. 4 a sectional view of the tape end, showing the extra thickness which may be needed on the hook leg (32) to accommodate the push pin (16). The slidable apertures (22) may also be lengthened to accommodate the thickness as mentioned above. Also illustrated in FIG. 4 are some of the capabilities which may make it possible to take a measurement that otherwise could not be achieved without the aid of another person, nail, etc. Whereas when the push pin (16) is engaged into the subject being of the consistency of wood or such the user alone may be able to do so.

FIG. 5 shows a plan view of the fragmentary end of the tape embutted into the work piece. When an embutted measurement needs to be done, the push pin (16) may be designed to not exceed the end of the thickening plates (26) as not to interfere with the measurement. Also the push pin (16) may rotate in its holding apparatus (30) so that the entire tape measure can pivot from this point. The push pin head (17) after being in use may extend from the end of the end hook (20) at a maximum of ninety degrees parallel to the side edge of the tape, also when measuring is to be done the pin head (17) might be at an angle to where it protrudes outward as shown in FIG. 5 (16a). When a measurement is needed for example, an "abutment measurement" as soon as the tape end is pushed against the surface it may automatically be set into the position shown in FIG. 5 (17) and when the tape is retracted in to the housing it may also be set in the same position and manner.

FIG. 6 shows a side plan view of the tape end, indicating the tapered end of the magnet, which may be needed to provide a smooth and easy entry in to the housing.

FIG. 7 is a front view of the end hook drawn to an enlarged scale to see the spring (38), push pin (16) and push pin retainer (16a).

In FIG. 8 you can see the end hook magnet (12) as it may be attached to tape (18) by rivets (24) and the pointed end of the push pin (16) can be seen in center of hook leg (32). A fragmentary sectional view of FIG. 5 can be seen in FIG. 4 with a brief demonstration of push pin (16) imbedded into work piece (44) to show the different capabilities of the present invention vs. prior art.

FIG. 9 shows the tape end with the modification of the push pin (16), thickening plates (26), end hook magnet (12) and push pin retainer (16a).

FIG. 10 shows the tape end with the modification of the push pin (16) with some type of threads (49) to aid in insertion or holding by twisting the pin head (17).

The manner of using the modified tape end and housing may be described as follows. One may first extract the tape end from the housing and place it on an edge where the hook leg may attach to a surface. The push pin feature may be placed anywhere on the subject simply by pushing the pin into the material. The magnetic end can be placed on any steel surface along with the magnetic housing which may allow the whole device to be attached to any steel object and left to stay if desired. To remove the pin simply grasp the pinhead and with a back and forth spinning motion pull upward and away from work piece. To remove the tape end hook magnet, if in reach of end hook magnet or tape end, simply grasp tape end and remove. If out of reach of tape end, with either hand extend the arm away from surface with a slight pull to create a hinging effect at the hook leg, this will pull the magnet away from the surface and release. The housing may be removed by simply grasping it and twisting the wrist until it releases. The present invention provides a solution to the tape end from falling off the subject as what happens when slack is applied or due to the shape or angle of the work piece.

Another object of the invention may be to provide a tape measure that can be virtually attached to a metal surface in whole, both tape end and housing, leaving the user to have both hands free in the flat, horizontal, vertical and overhead positions.

Yet another object of the present invention is the push pin feature. This may allow the user to attach the end hook to a object or surface that has no right angle, (see FIG. 4 work piece 44) as to what's needed in prior art. Also it may be placed anywhere on the work piece, for example it may be placed in the middle of a sheet of Drywall and the tape extended to the desirable distance, also to create a pivot point to make radius and compass lines or cuts as to where this could never be achieved in prior art with the ergonomics and ease of this design.

The spring located over push pin between pin head and holding apparatus may be designed to keep the pin disengaged so that it will not extend out the bottom of the hook leg and therefore may not scratch any surfaces. The spring will be of little tension so that it will function properly but just enough to keep it disengaged. All of the mentioned embodiments can be made with various types of materials.

A further object of the present invention is it may have a suction cup attachment on the end hook for the purpose of measuring smooth surfaces such as glass, Formica, a car's surface and the like. For example, a measurement may be taken from any given point. If someone wanted to measure from any given point with nowhere to hook the end on, it would be possible to do this with glass, Formica, a car's surface etc.

Yet another object of the present invention is that the tape strip itself may be magnetized without the end hook magnet. The end hook magnet can be replaced with a "peel and stick" type magnet that can be placed onto the tape end or elsewhere with its shape and form permitting. The tape housing magnet can be replaced with a "peel and stick" type magnet that can be placed on the bottom of the tape housing or where desired, form and shape permitting.

The end hook and housing features may also be used for other types of tape measures in all sizes. The push pin can be left out leaving a void and guided pathway so that a nail may be used in its place.

Further, even a recoilable safety lanyard could be built into the tape housing.

As can be easily understood from the foregoing, the basic concepts of the present invention may be embodied in a variety of ways. It involves both self holding measuring techniques as well as devices to accomplish the appropriate measurement. In this application, the self holding measurement techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be added for the device described, but also method or process claims may be added to address the functions the invention and each element performs. It should also be understood that a variety of changes may be made without departing from the essence of the invention. Such changes are also implicitly included in the description. They still fall within the scope of this invention.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "retraction element" should be understood to encompass disclosure of the act of "retracting"—whether explicitly discussed or not—and, conversely, were there only disclosure of the act of "retracting", such a disclosure should be understood to encompass disclosure of a "retraction element" and even a means for "retracting" Such changes and alternative terms are to be understood to be explicitly included in the description.

All references in the disclosure or listed in the list of References filed with the application are hereby incorporated by reference; however, to the extent statements might be considered inconsistent with the patenting of this/these invention(s) such statements are expressly not to be considered as made by the applicant(s).

Thus, the disclosure should also be understood to support additional claims, including at least; i) each of the self holding measuring devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

What is claimed is:

1. A self holding tape measure comprising:
   a. a flexible tape strip having a distal end;
   b. measurement indications on said flexible tape strip;
   c. a container element into which said flexible tape strip can retract;
   d. a retraction element located at said container element and to which said flexible tape strip is responsive;
   e. an end hook attached to said distal end of said tape strip;
   f. a retractable omnidirectional surface retention element located at said end hook which interacts with a surface to retain said distal end of said tape strip during measurement in a plurality of directions, wherein said omnidirectional surface retention element comprises:
      1. a pointed surface having an axis;
      2. an elastic bias element;
      3. a movement guide comprising a deformed surface wherein said deformed surface comprises:
         i. a first band positioned off said axis in a first direction;
         ii. a second band located adjacent said first band and positioned off said axis in a second direction; and
         iii. a third band located adjacent said second band and positioned off said axis in said first direction, and
      4. a protrusion to which said movement guide is responsive and which limits movement of said pointed surface; and
      5. a twistable pin head located opposite to said pointed surface, and
   g. a thread element located adjacent said pointed surface; and
   h. a shield within which said pointed surface retracts in response to said elastic bias element.

2. A self holding tape measure as described in claim 1 wherein said elastic bias element comprises a spring positioned in between said pin head and said end hook.

3. A self holding tape measure as described in claim 1 wherein said omnidirectional surface retention element further comprises a magnetic element.

4. A self holding tape measure as described in claim 3 wherein said container element has a base and further comprising a magnetic element on said base of said container element.

5. A self holding tape measure as described in claim 3 wherein said magnetic element comprises a plurality of planar magnets located on said end hook.

* * * * *